United States Patent
Unnikrishnan et al.

(10) Patent No.: US 10,923,729 B2
(45) Date of Patent: Feb. 16, 2021

(54) DEVICE AND METHOD OF MANUFACTURING HIGH ASPECT RATIO STRUCTURES

(71) Applicant: Nederlandse Organisatie voor toegepast-natuurwetenschappelijk onderzoek TNO, 's-Gravenhage (NL)

(72) Inventors: Sandeep Unnikrishnan, 's-Gravenhage (NL); Lucas A. Haverkate, Eindhoven (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 286 days.

(21) Appl. No.: 15/744,628

(22) PCT Filed: Jul. 15, 2016

(86) PCT No.: PCT/NL2016/050529
§ 371 (c)(1),
(2) Date: Jan. 12, 2018

(87) PCT Pub. No.: WO2017/010887
PCT Pub. Date: Jan. 19, 2017

(65) Prior Publication Data
US 2018/0205089 A1    Jul. 19, 2018

(30) Foreign Application Priority Data

Jul. 15, 2015 (EP) .................................. 15176799

(51) Int. Cl.
*H01M 4/70* (2006.01)
*H01M 4/04* (2006.01)
(Continued)

(52) U.S. Cl.
CPC ........... *H01M 4/70* (2013.01); *H01M 4/0404* (2013.01); *H01M 6/40* (2013.01); *H01M 10/052* (2013.01);
(Continued)

(58) Field of Classification Search
CPC ........ H01M 4/70; H01M 4/0404; H01M 4/13; H01M 4/667; H01M 4/661;
(Continued)

(56) References Cited

U.S. PATENT DOCUMENTS

2009/0214956 A1    8/2009  Prieto et al.
2009/0316335 A1*  12/2009  Simon ..................... C25D 3/02
                                                         361/502
(Continued)

FOREIGN PATENT DOCUMENTS

CN    101246955 A    8/2008
CN    103151492 A    6/2013
(Continued)

OTHER PUBLICATIONS

Vereecken et al., "Conformal Deposition for 3D Thin-Film Batteries," ECS Transactions, vol. 58, No. 10, Aug. 31, 2013 (pp. 111-118) XP055213736.
(Continued)

*Primary Examiner* — Milton I Cano
*Assistant Examiner* — Kiran Akhtar
(74) *Attorney, Agent, or Firm* — Leydig, Voit & Mayer, Ltd.

(57) ABSTRACT

A method of manufacturing a Lithium battery (100) with a current collector formed of pillars (11) on a substrate face (10), wherein the method comprises: forming elongate and aligned structures forming electrically conductive pillars (11) on the substrate face (10) with upstanding pillar walls extending from a pillar base to a pillar top; wherein the
(Continued)

pillars are covered with a laminate comprising a first electrode (12), a solid state electrolyte layer (13); a second electrode layer (14), and a topstrate (20) forming an electrode part; and wherein at least one of the first electrode layer, second electrode layer and topstrate layer is non-conformally coated to prevent Lithium intercalation into the first or second electrode near the pillar base by limiting cracking at the pillar base when volume expansion/contraction of the electrode layers happens during the battery charge/discharge cycles.

11 Claims, 9 Drawing Sheets

(51) Int. Cl.
| | | |
|---|---|---|
| *H01M 6/40* | (2006.01) | |
| *H01M 10/0525* | (2010.01) | |
| *H01M 10/052* | (2010.01) | |
| *H01M 10/058* | (2010.01) | |
| *H01M 10/0562* | (2010.01) | |
| *H01M 4/13* | (2010.01) | |
| *H01M 4/66* | (2006.01) | |
| *H01M 4/02* | (2006.01) | |

(52) U.S. Cl.
CPC ..... *H01M 10/058* (2013.01); *H01M 10/0525* (2013.01); *H01M 4/13* (2013.01); *H01M 4/661* (2013.01); *H01M 4/667* (2013.01); *H01M 10/0562* (2013.01); *H01M 2004/021* (2013.01); *H01M 2004/025* (2013.01); *H01M 2220/20* (2013.01); *H01M 2300/0068* (2013.01); *Y02T 10/70* (2013.01)

(58) Field of Classification Search
CPC .......... H01M 10/0525; H01M 10/058; H01M 10/052; H01M 10/0562; H01M 6/40; H01M 2220/20; H01M 2004/025; H01M 2004/021; H01M 2300/0068; H01M 4/75; H01M 4/64; Y02T 10/7011
See application file for complete search history.

(56) References Cited

U.S. PATENT DOCUMENTS

| | | | |
|---|---|---|---|
| 2012/0045688 A1 | 2/2012 | Liu et al. | |
| 2013/0149605 A1* | 6/2013 | Kakehata | H01M 4/045 |
| | | | 429/211 |
| 2013/0164611 A1* | 6/2013 | Nanba | H01M 4/70 |
| | | | 429/211 |
| 2013/0189576 A1* | 7/2013 | Verbrugge | H01M 4/366 |
| | | | 429/211 |
| 2013/0190956 A1 | 7/2013 | Zhamu et al. | |

FOREIGN PATENT DOCUMENTS

| | | | |
|---|---|---|---|
| CN | 104393257 A | 3/2015 | |
| JP | 2008171788 A | 7/2008 | |
| WO | WO 2008/030215 A2 | 3/2008 | |
| WO | WO-2008030215 A2 * | 3/2008 | .......... H01M 4/0421 |
| WO | WO 2011/094642 A1 | 8/2011 | |
| WO | WO 2015/126248 A1 | 8/2015 | |

OTHER PUBLICATIONS

European Patent Office, International Search Report in corresponding International Application No. PCT/NL2016/050529 dated Dec. 5, 2016 (3 pages).

National Intellectual Property Administration, Peoples Republic of China, Chinese Office Action in corresponding Chinese Application No. 201680051335.3 dated Jun. 22, 2020 (10 pages).

* cited by examiner

DEVICE AND METHOD OF MANUFACTURING HIGH ASPECT RATIO STRUCTURES

CROSS-REFERENCE TO RELATED APPLICATIONS

This patent application is a U.S. National Phase of PCT International Application No. PCT/NL2016/050529, filed Jul. 15, 2016, which claims priority to European Application No. 15176799.3, filed Jul. 15, 2015, which are both expressly incorporated by reference in their entireties, including any references contained therein.

FIELD

The present invention relates to a method of manufacturing high aspect ratio structures for high cycle charging/discharging in particular for electrochemical or electro-optical devices with cycles exceeding 10.000.

BACKGROUND

In vehicle applications e.g. for use in a hybrid electric vehicle (HEV), a battery storage system is responsible for supplying pulsed power (high currents) e.g. to enable the start-stop function of a micro-HEV or acceleration of an HEV. The battery storage can also recuperate the braking (kinetic) energy in a matter of seconds (up to 15 seconds) and store this recovered energy. This function is referred to as regenerative braking.

Conventional lead-acid battery packs are conventionally uncapable of capturing the braking energy due to a limited charge uptake. Therefore many-battery systems exist where next to the lead acid battery, providing the cold cranking of the battery, one or more auxiliary batteries are introduced. Further, the conventional battery storage configurations are bulky and heavy, which is a highly undesirable feature for a vehicle. Additionally, it takes 6-8 hours to recharge a battery stack for motorcycle or automobile applications.

Thus, it is an object of the present invention to provide a vehicle power source that is compact, light-weight, and of high energy density, and to provide a vehicle containing such a power source.

It is another object of the present invention to provide a vehicle power source that exhibits a high energy density but does not involve a many-battery storage combination, and to provide a vehicle containing such a power source.

It is yet another object of the present invention to provide a vehicle power source that exhibits a high energy density and is capable of capturing the electric energy converted from vehicle kinetic (e.g. braking) energy, and to provide a vehicle containing such a power source.

Another object of the present invention is to provide a vehicle power source that can be fully re-charged in less than 30 minutes, preferably less than 15 minutes, and further preferably less than 5 minutes.

It is still another object of the present invention to provide a micro-EV, HEV, plug-in HEV, all-electric vehicle (All EV), or any power-assisted vehicle that has one wheel, two wheels (e.g. power-assisted bicycle, e-scooter, e-motorcycle), three wheels (e.g., e-tricycle), four wheels (e.g., automobile, small truck, wheelchair, fork lift, golf cart, specialty vehicle, etc.), multi-wheel vehicle (e.g., bus, big truck, train, rapid-transit vehicle, etc.), boat or other waterborne or sea vehicle, air vehicle, including aircraft and unmanned air vehicle or unmanned areal vehicle. This vehicle has a power source that is compact, light-weight, high-power, and high-energy density and contains at least a SMC cell.

In electronic devices of the present type a rechargeable Li-ion solid-state battery has current collector of non-planar design. Thin-film battery structures of known type are disclosed e.g. in WO2010032159, the contents of which are included by reference, wherein for example all-solid state compositions are deposited on 3D micro-patterned structures. In this respect, where early battery structures utilize liquid electrolytes, all-solid state compositions utilize electrolytes of a solid state type, which are inherently safer in use. In these structures a large variety of materials are and have been used for the respective electrodes for example as disclosed in US 20110117417. In discharging battery mode, the anode is the "negative electrode" to which the positive current flows, from the cathode, being the "positive electrode". During charge these functions are reversed. Irrespective charging mode, the electrochemical relationship may be characterized by charge exchange between a negative electrode material and a positive electrode material, the negative electrode material having a workfunction or redox potential that is lower than the workfunction or redox potential of the positive electrode material.

For example, known negative electrode (anode) materials are $Li_4Ti_5O_{12}$ (LTO); $LiC_6$ (Graphite); $Li_{4.4}Si$ (Silicon) and $Li_{4.4}Ge$ (Germanium) known positive electrode (cathode) materials are $LiCOO_2$ (LCO), $LiCoPO_4$, (doped) $LiMn_2O_4$ (LMO), $LiMnPO_4$, $LiFePO_4$ (LFP), $LiFePO_4F$ (LFPF) or $LiCO_{1/3}Ni_{1/3}Mn_{1/3}O_2$ (LCNMO).

Known (solid state) electrolytes might include lithium iodide (LiI), lithium phosphate ($Li_3PO_4$) and lithium phosphorus oxynitride (LiPON). In addition, lithium salts, such as $LiPF_6$, $LiBF_4$ or $LiClO_4$ in an organic solvent, such as ethylene carbonate, dimethyl carbonate, diethyl carbonate, propylene carbonate are known to have a typical conductivity of about 10 mS/cm at RT. The electrolyte decomposes on initial charging and forms a solid layer called the solid electrolyte interphase (SEI).

Solid polymer separators may also be included, such polymers having transport capacity often due to having a lithium salt disposed therein as known in the state of the art. Work has also been performed with lithium and halide materials, particularly, in some examples, a lithium aluminum tetrahalide such as lithium aluminum tetrafluoride ($LiAlF_4$).

Once such structures are made on a bendable metal foil, they can be manufactured in large-scale processes, e.g. a roll-to-roll process where the following can be done: 1) Coiling, winding or stacking it to increase the energy or power density per unit volume. 2) Integrating it on flexible devices like flexible displays, signage etc.

Although high-aspect ratio structures can be made in nanometer scale the height or depth of these high-aspect ratio structures need to be in the microns range for delivering enough charge capacity for the battery. The reason pillar structures are preferred is due to the easy accessibility of their entire surface when compared to porous or perforated structures of similar aspect ratio and dimensions. In the prior art many methods to produce these are non-economical (e.g. involving silicon microfabrication and long-time electrodeposition). Moreover, to do any of these, the design of the stack is in need for optimization because otherwise while winding or flexing, the pillar structure could be damaged inhibiting proper electrochemical action of the device. Furthermore, it has come to the attention that existing solid state Li-based intercalation electrolytes induce stress in the high-aspect ratio structures that may limit lifetime and reduce the number of cycle periods. Accordingly, it is sought to provide a high-aspect ratio structure wherein cycle periods can be increased and internal stress is reduced.

SUMMARY OF THE INVENTION

It is an object of the invention to provide a method for producing an electronic device having a current collector capable of a high specific charge collecting area and power, having a proper dimensioning but is also achieved using a simple and fast technique and resulting in a robust design.

To this end, according to an aspect a method of manufacturing a Lithium battery with a high-aspect ratio structure of pillars on a substrate face, wherein the method comprises: forming elongate and aligned structures forming electrically conductive pillars on the substrate face with upstanding pillar walls extending from a pillar base to a pillar top; wherein the pillars are covered with a laminate to the pillars, comprising a first electrode, a solid state electrolyte layer; a second electrode layer, and a topstrate forming an electrode part; and wherein at least one of the first electrode layer, second electrode layer and topstrate is non-conformally coated to prevent Lithium intercalation into the first or second electrode near the pillar base.

Throughout the application, the term "high aspect ratio structure" signifies a 3D structure on a substrate having pillars upstanding from a base that is coplanar with a substrate surface, i.e. embedded or outstanding from a substrate's face, the pillars more particularly within 20 degrees relative to normal to the substrate surface and having a height dimension, separated by a base having an interdistance between adjacent pillars, i.e. a length dimension normal to the walls coplanar along the base, wherein the ratio of the height dimension and the length dimension is relatively high, that is, higher than 50, or even higher than 80 or even more than 100. In a typical arrangement, the pillars may have height dimensions, i.e. a height separating a base plane from a planar surface of about 25-200 micrometer, preferably 50-100 micrometer wherein the length dimensions, i.e. the length separating opposing pillars, and can be in the order of 1-10 micrometer, preferably 2-4 micrometer. For such structures, the substrate as presently disclosed is electrically conductive with a surface area of the current collector that is significantly increased, which enhances the charge collecting capacity of the current collector. Moreover, for such structures, it is possible to apply a multilayer coating without compromising the functionality of the multilayer coating. Examples of such functionality may be multilayers such as a battery multilayer or photovoltaic multilayer or single layer coatings.

In addition, according to an aspect of the invention, for such high-aspect ratio structures optimal current collecting performance may be provided in the form of a homogenously coated pillar wherein the high-aspect ratio structure comprises metal or metalized pillars having a radius of curvature larger than 50 nanometer. An aspect of improved performance is a trade-off that is found by a density of the high-aspect ratio structure demanding smaller pitches and the surrounding conformal coating. In this respect, electrode thicknesses in the battery multilayer may be varied and are correlated to match their volumetric storage capacities for Lithium-ions while charging and/or discharging. A known matching relationship is governed by a C-rate number, known in the art. A C-rate is a measure of the rate at which a battery is charged or discharged relative to its maximum capacity. For example the capacity of the electrode layers at a certain C-rate are matched by controlling layer thickness and material composition. A further aspect of these structures is that for a charge collector having a conformal coating, for instance, a battery multilayer, a minimum gap of e.g. 50 nm can be still be provided between homogenously coated high aspect ratio structures. The gap may be filled with a topstrate material for instance of a conductive nature (metal, e.g. copper, conductive glue) for example provided by a deposition process (ECD, PVD, CVD). It is noted that for a conformally coated stack, with the topstrate material not extending to the base, lithium intercalation can be prevented near the base.

The topstrate could be conductive thus helping in current collection can also have adhesive property, which helps in stacking and could be a barrier material to protect the stack against water or oxygen.

Another aspect of the invention is that a 'conformal coating' is a coating that may comprise a plurality of layers that at least conformally coat the pillars of the high aspect ratio structure. In this application, the term 'non-conformal' is used to indicate that at least one layer of the layer structure, i.e. the laminate of first electrode, electrolyte layer ad second electrode, does not conformally extend between the pillars, but is limited to the pillar walls. Furthermore, in this application, the 'first electrode' of the laminate is used to indicate the bottom layer of the laminate, i.e. the layer with the smallest radius of curvature. The 'second electrode' is used to indicate the top layer of the laminate, i.e. the layer with the highest radius of curvature.

It is noted that in US2009214956 a structure is proposed wherein electrolyte material, is conformally coated onto conducting nanowires and wherein cathode material, in electrical connection with a second conductive material, is interpenetrated between electrolyte-coated nanowires. In contrast, the coating of the present disclosure concerns, inter alia, a multilayer including an electrolyte and providing a minimum gap between adjacent multilayers.

With thickness is meant 'average thickness' which may render an equivalent function of a certain mathematical thickness. In the application, where layers are coated, it is intended that these coatings at their functional locations are substantially conformal, but this is not necessary, as long as a functional layer is designed to have a thickness where a tradeoff is reached between internal resistance, and energy density. In the specification, depending on context, functional layers may not be in direct contact with other functional structures, but may have intermediate layers or structures in between that may enhance functionality. In that respect, the skilled person will understand that where it is described, for example, that the negative electrode layer is 'a bottom layer', 'in contact' with a charge collector, such would be interpreted as 'in electrical contact' not excluding a possible Lithium diffusion barrier layer, current collecting layer, process protection layer etc. enhancing functionality. This similarly counts for electrolyte layers 'in contact' with the negative electrode and positive electrode layers.

The inventors furthermore surprisingly found, for the structures of interest, that a radius of curvature of the high aspect ratio structures is larger than 200 nanometer to improve the conformal layer quality. For such ratios the internal stresses for charging and discharging are reduced, resulting in higher lifetimes of the battery.

These and other aspects of the invention will be discussed in more detail with reference to drawings, wherein like reference numerals refer to like elements. It will be appreciated that the drawings are presented for illustrative purposes and may not be used for limiting the scope of the appended claims.

DETAILED DESCRIPTION OF THE DRAWINGS

In the following examples in more detail aspects of the invention will be illustrated in the form of an electrochemical device, more specifically a battery device, for instance of a lithium ion type, more specifically having a 3D collector structure for enhancing the charge collecting specific area of the collector, that is in electrical contact with battery multilayer, in particular, a negative electrode layer thereof.

Figure 1:
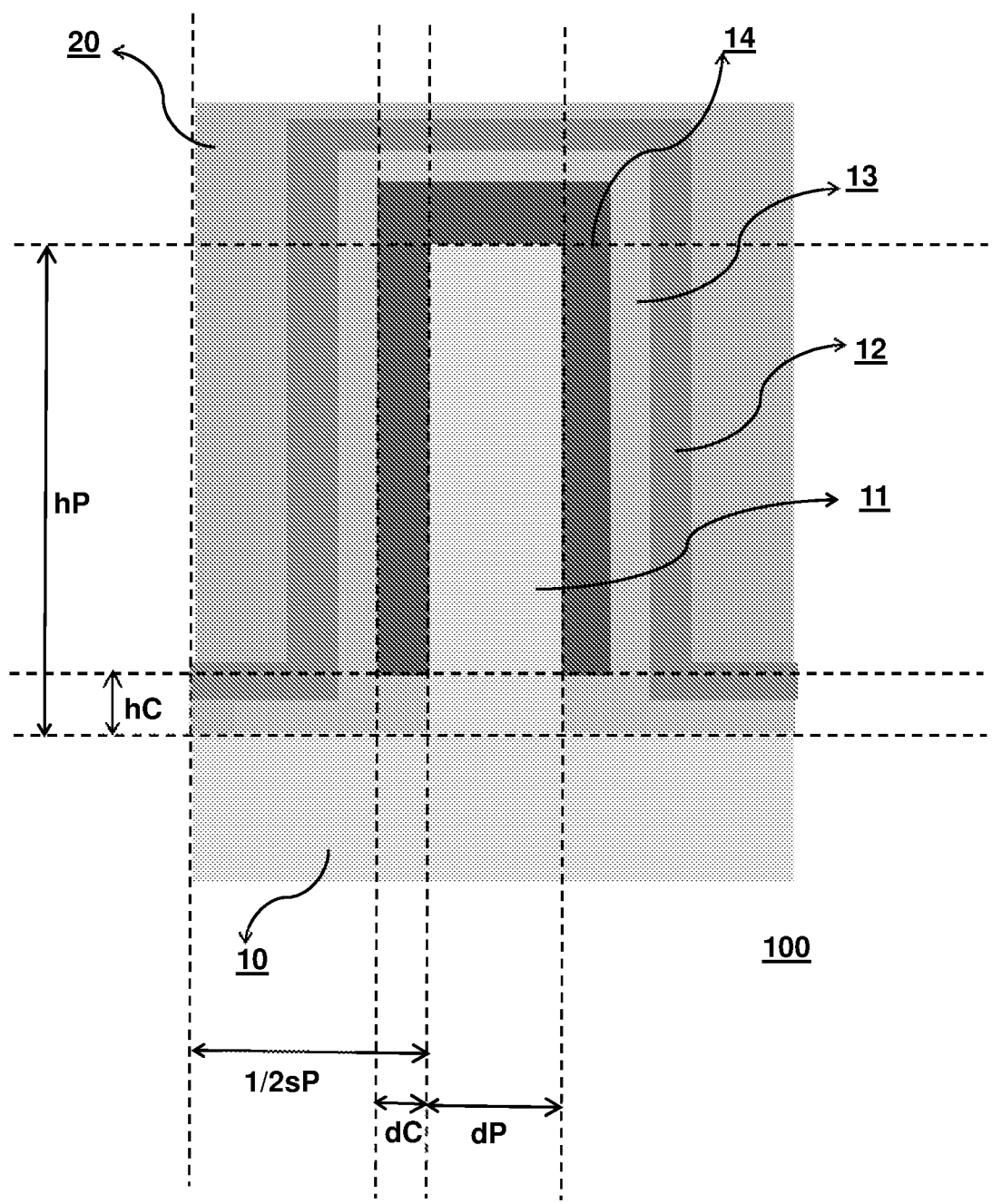
FIG. 1 shows a first embodiment.

FIG. 1 schematically shows a high aspect ratio structure according to an embodiment of the present invention. In the figure, a single pillar 11 is shown as part of a structure of many pillars having an interdistance sP, e.g. with an interdistance sP between the pillar walls that ranges between 500-2500 nm.

The electronic device 100 comprises electronic circuitry (not depicted) equipped with a current collector 10 formed by a metal substrate having a face forming a high-aspect ratio structure of pillars 11. The walls have for example, an aspect ratio larger than 10 or even larger than 50. The pillars can e.g. be formed by a micropattern mask, so that isolated micro pillars are formed. In the specification, the term pillars or micropillars is used to distinguish from 'dense' nanopillar structures. Such dense structures, in contrast may have elongate tubes having diameter dimensions smaller than 300, or even smaller than 50 or 10 nm and with interdistances d smaller than about several hundreds nm, e.g. in the range of 50-300 nm, which are too densely packed without sufficient gap for conformally coating multilayer stacks on them.

The micropillar structure may have pillar heights hP of more than 100 nm, arbitrary elongate shapes and diameters dP at least larger than the said 10 nm, typically more than 100 nm and in this respect typically qualify as high aspect ratio structures.

In its simplest conceptualization, the battery device 100 comprises two current collectors 10, 20, one that supplies electrons by virtue of an oxidation process occurring at an electrode layer, in the example termed the anode 12, and a second one that consumes electrons by virtue of a reduction process occurring at that electrode, termed the cathode 14. In discharging battery mode, the anode 12 is the "negative electrode" to which the positive current flows, from the cathode, being the "positive electrode". During charge mode these functions are reversed. Irrespective of charging mode, the electrochemical relationship may be characterized by charge exchange between a negative electrode material and a positive electrode material, the negative electrode material having a workfunction or redox potential that is lower than the workfunction or redox potential of the positive electrode material.

Thin film ion batteries, including those of the thin film solid state lithium ion type, can be prepared from various deposition techniques to fabricate negative electrode 12, positive electrode 14, and electrolyte materials 13 bonded together to form the battery device 100. Such techniques may typically include depositing thin films of such materials using vacuum deposition or other techniques that result in similar thin films, to produce the "thin film" batteries. Thin film batteries are often employed in applications in which space and weight may preferably be conserved and extremely long cycle life may be desired. The topstrate 20 could be any organic or inorganic material. It can for example have some other extra functionality such as a current collector and may optionally, be electroplated over the pillars after the active layers of the battery stack are deposited. Also, the current collector can be used as a planarizing topstrate that planarizes the high-aspect ratio structure 100.

Accordingly, battery device 100 has a high-aspect ratio structure of pillars 11 on a substrate face 10 and comprises elongate and aligned structures forming electrically conductive pillars 11 on the substrate face 10 with upstanding pillar walls extending from a pillar base to a pillar top; wherein the pillars 10 are covered with a laminate 12, 13, 14 conformal to the pillars. The laminate comprises a first electrode layer 12, a solid state electrolyte layer 13; an second electrode layer 14, and a topstrate 20 forming an electrode part. An important aspect of the present invention is that at least one of the first electrode layer, second electrode layer and topstrate layer is non-conformally coated to prevent Lithium intercalation into the first or second electrode near the pillar base.

This will avoid cracking at the base corners around the pillars while volume expansion/contraction of the electrode layers happens during charging/discharging of the battery. For example, as shown in the Figure, the first electrode layer 14 is non-conformally coated. A typical minimum distance hC that separates the cathode layer from the substrate base ranges between 20 and 1000 nanometer.

FIGS. 2-6 show various concepts of electrode layers that do not extend to the pillar base or top, to prevent Lithium intercalation into the electrode layer near the pillar base. In the figures, like features are referenced by like numerals. For example, in FIG. 2, the electrolyte layer 13 is conformally coated around the pillar 11, which has a capped first electrode layer (anode layer) 14 having a minimum distance hC above the pillar base of substrate 100 ranging between 300 and 1000 nanometer. In addition, also the second electrode layer has a minimum distance hA, which is preferably larger than hC, to further prevent intercalation near the pillar base.

Figure 3:
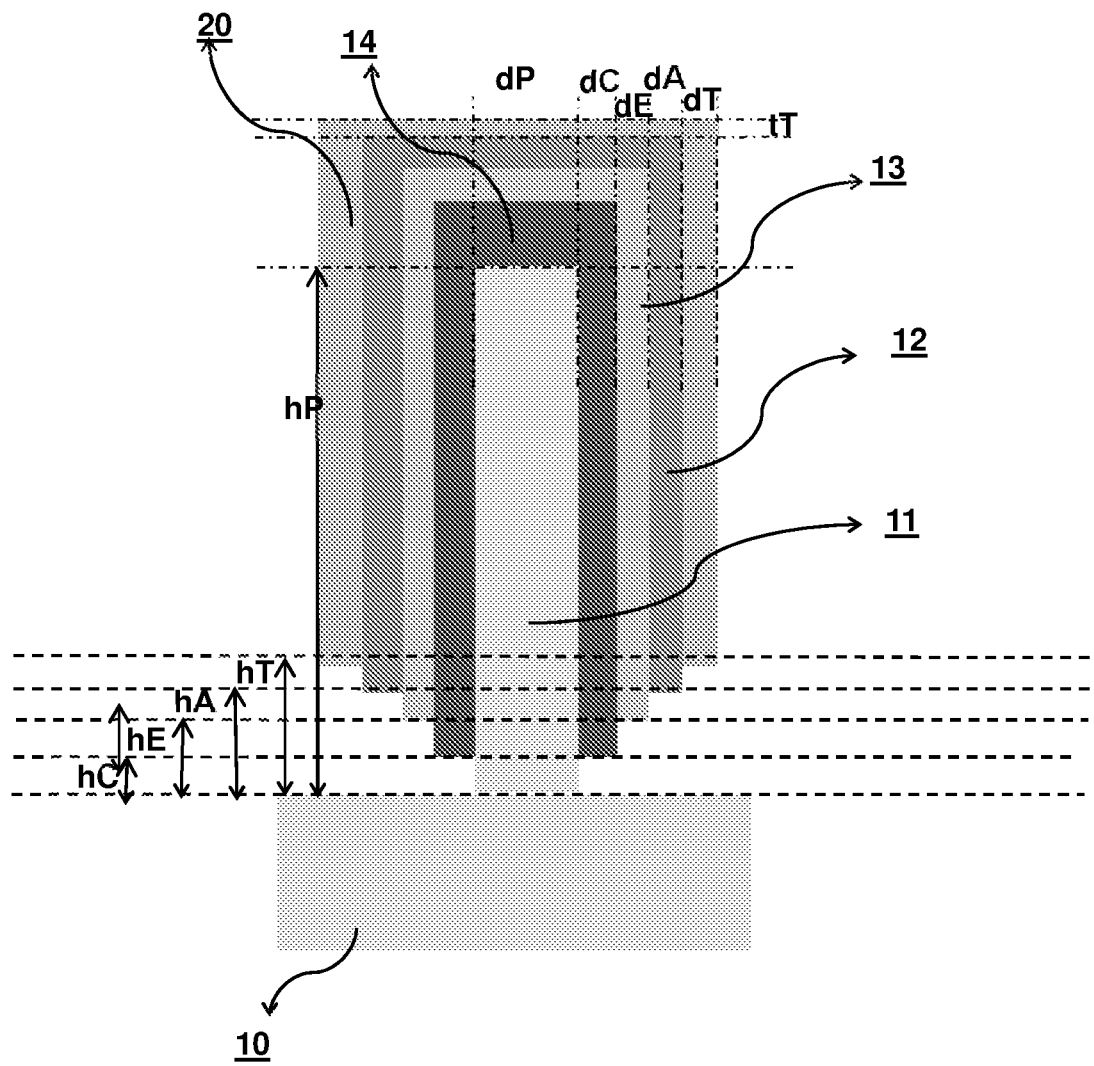
FIG. 3 shows a third embodiment.

In more detail, in FIG. 3, for a topstrate 20 of thickness. tT, an anode 12 of LTO, and a cathode 14 of LMNO, exemplary values of the electrode layers are provided in Table 1:

TABLE 1

| Parameter | Values |
| --- | --- |
| Porosity cathode [%] | 0-30 |
| Height Substrate [um] | 4-20 |
| Height pillars [um] (hp) | 30-120 |
| Final Interpillar Spacing | 0-1 |

TABLE 1-continued

| Parameter | Values |
|---|---|
| [um] (dT) | |
| Diameter pillars [um] (dP) | 1-9 |
| Thickness electrolyte [nm] (dE) | 100-1000 |
| Thickness first electrode layer [nm] (dc) | 200-2000 |
| Thickness second electrode layer [nm] (dA) | 60-2000 |
| Peak power C-Rate | 10-60 C |

For these values, exemplary applications for electrolyte: conductivity 10-3-10-7 S/cm at 20 deg C., with a 10-100 fold decrease at −20 deg C. are as follows in Table 2:

TABLE 2

| Application | Cell geometry | Battery dimensions |
|---|---|---|
| 12 V Starter/ Microhybrid 10-15 C. cold crank at −20 deg C. | First electrode layer 400-1500 nm, preferably 500-800 nm Pillar diameter <9 micron Electrolyte thickness 100-1000 nm | Size 40-85 Ah Weight 7-16.5 kg Vol 1.8-7 liter |
| Separate Microhybrid >30 C. (dis)charge peak | First electrode layer 500-1500 nm, preferably 700-1100 nm Pillar diameter <9 micron Electrolyte thickness 100-1000 nm | μHybrid (12 V or 48 V): Size: 5-40 Ah Weight: 7-16.5 kg Volume: 1.8-7 Liter |

Figure 4:
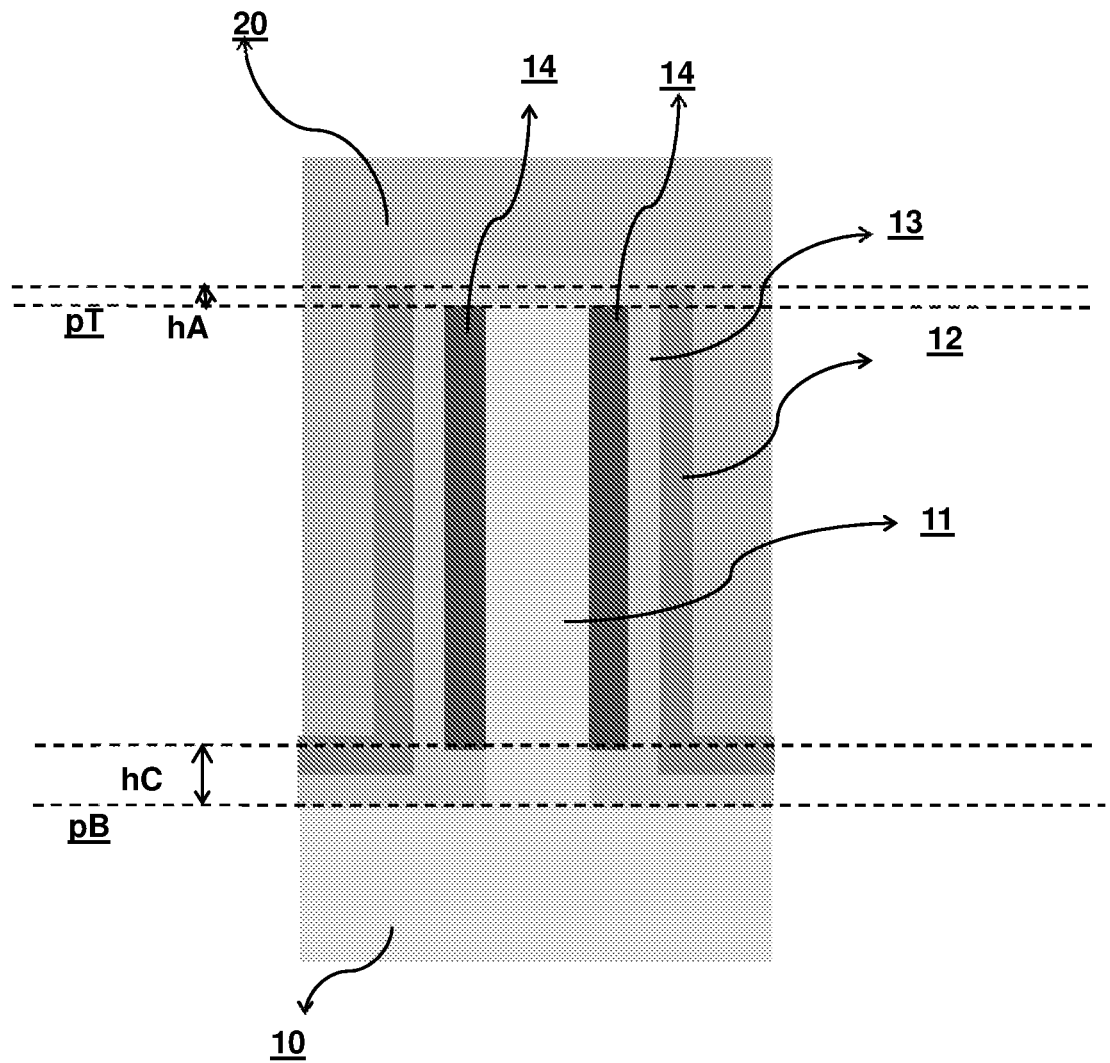
FIG. 4 shows a fourth embodiment.
Figure 5:
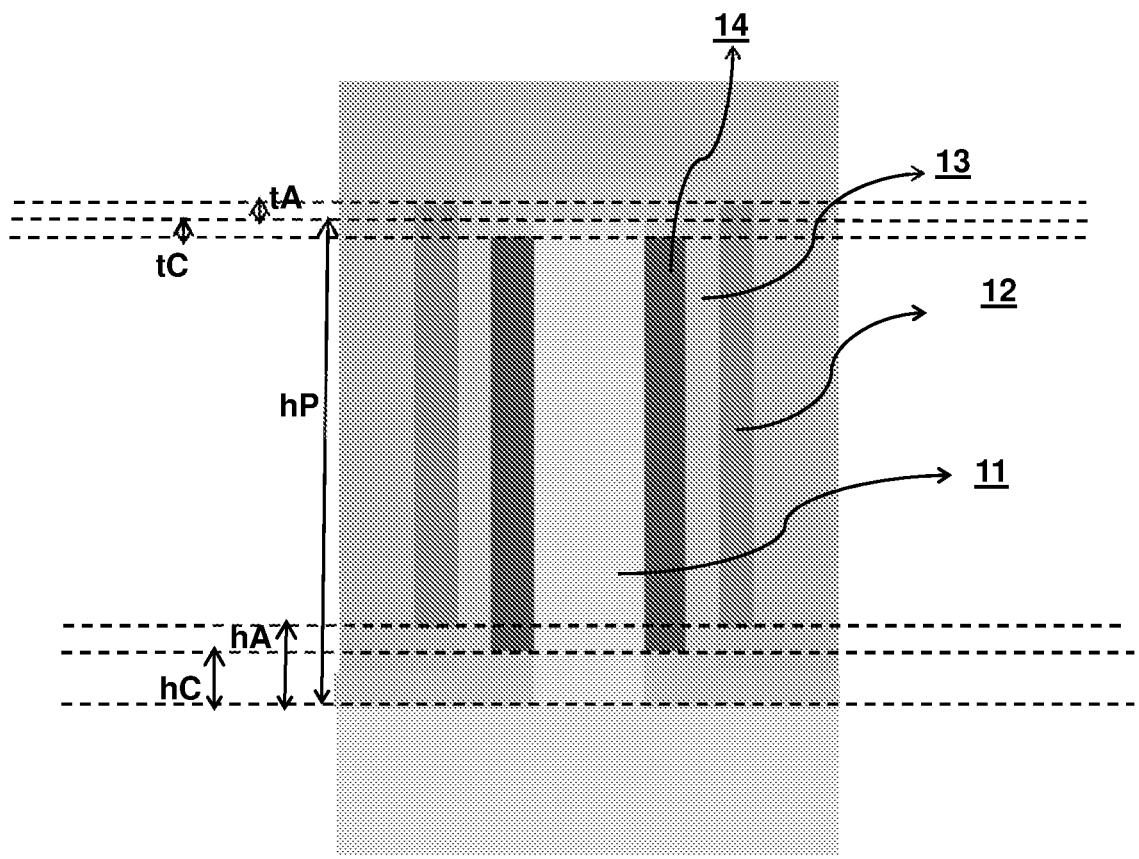
FIG. 5 shows a fifth embodiment.
Figure 6:
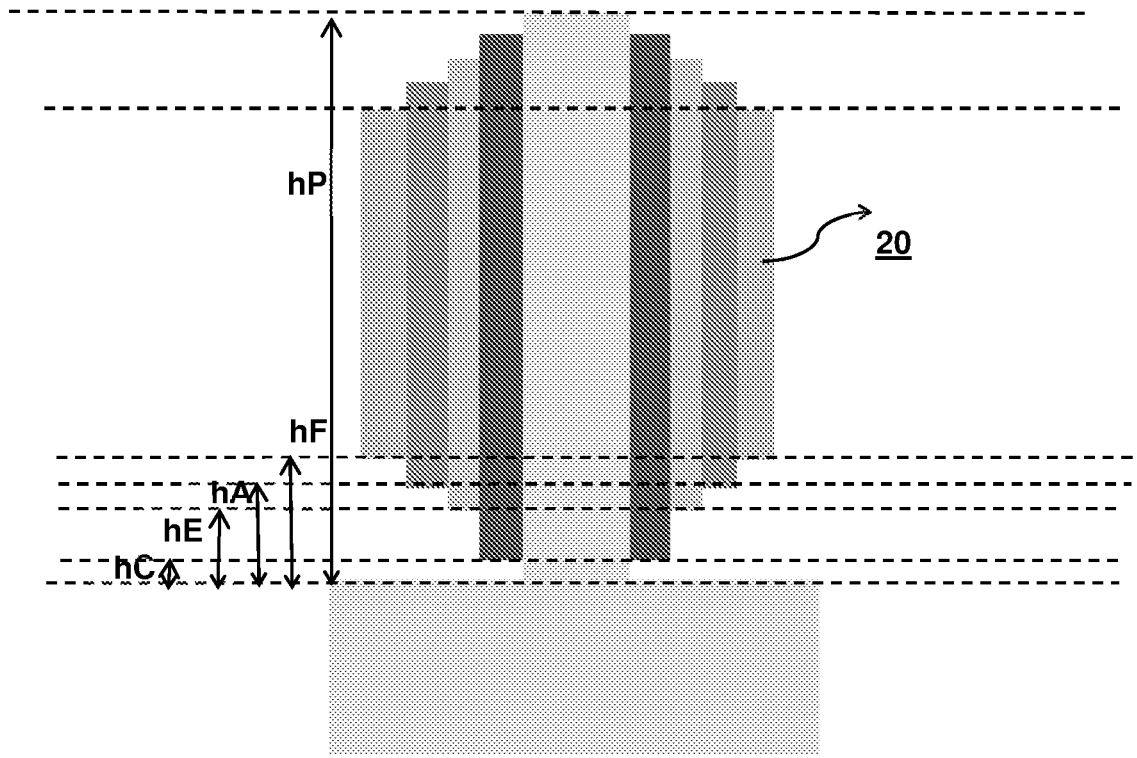
FIG. 6 shows a sixth embodiment.

FIGS. 4-6 show additional variants, wherein, in addition to the modified structure at the pillar base pB with a minimum interdistance hC of one of the laminate layers 12, 13, 14, at the pillar top, at least one of the first, second electrode layer and topstrate layer is non-conformally coated to prevent Lithium intercalation into the first or second electrode near the pillar top pT. As shown in FIG. 4, cathode layer 14 is coated in cylindrical form, e.g. by selectively electrodepositing a cathode layer based on a temporary sacrificial layer (the thickness of which determines the cathode cap coverage) and/or back etching of the top layers to expose the pillar top. In FIG. 4, it is shown that the anode layer 12 extends a small distance hA over the pillar top. In FIG. 5, it is shown that the anode layer 12 extends above the pillar top at a distance tA, and the cathode layer extends below pillar top at a distance tC. In FIG. 6 furthermore, a structure is shown, wherein with increasing minimum distance to the pillar base, hC, hE, hA and hF, the cathode layer 14, electrolyte layer 13, anode layer and conductive layer are formed in cylindrical fashion around the pillar wall, at a distance from pillar base and pillar top. E.g. conductive layer can be connected as a via structure or as a complementary pillar structure with a topstrate.

Figure 7:
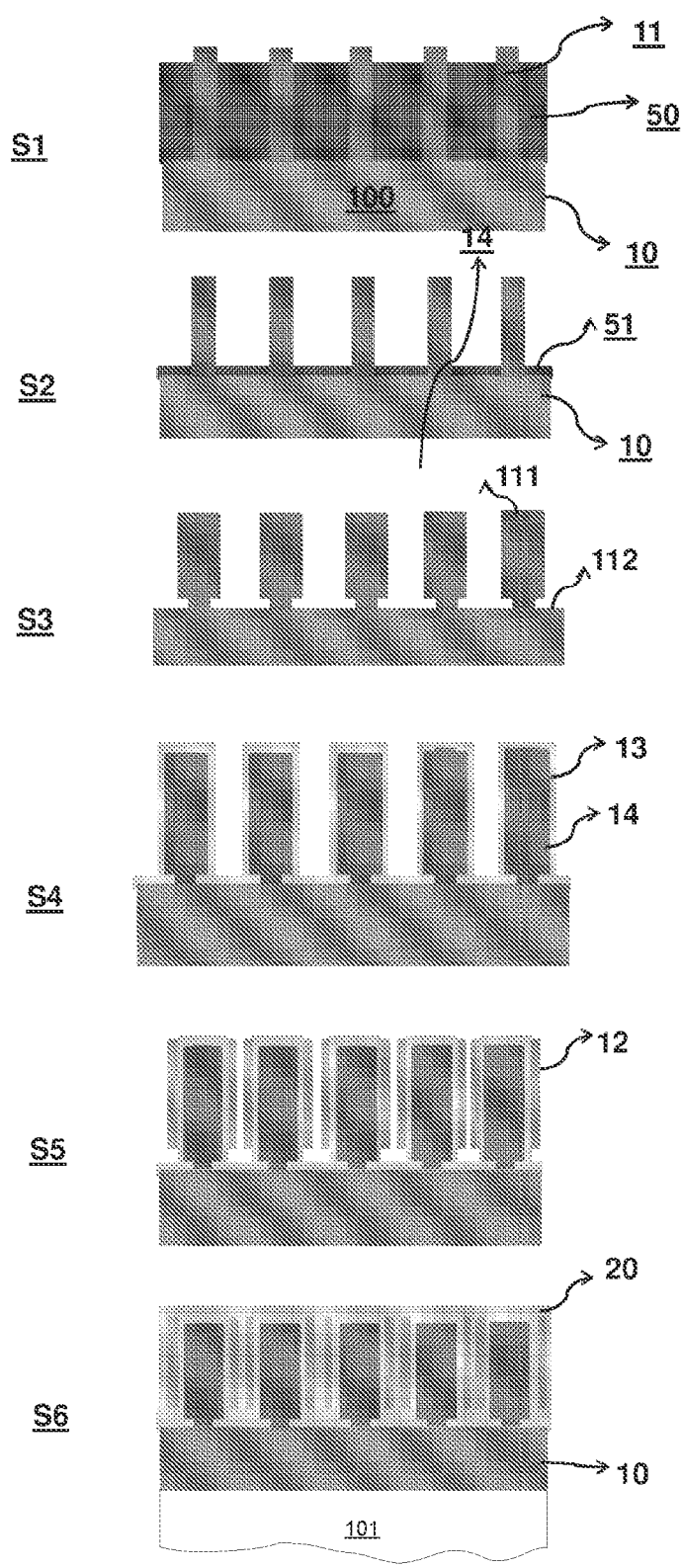
FIG. 7 shows an exemplary process steps for manufacturing a high aspect ratio structure according to an aspect of the invention.

FIG. 7 shows an exemplary process options to manufacture the structures disclosed in the previous figures. These structures may be provided by a combination of known process steps. For example, in a first step S1, a pillar structure 100 is provided, e.g. by a templating process, wherein pillars are grown templates that can be lithographically provided, for instance, in an AlO2 substrate, wherein holes are back etched, and pillars are formed by a plating step. Alternatively, the pillar structure may be provided by conductive nanotubes, e.g. carbon nano tubes or the like. In order to manufacture a pillar structure with a non-conformal coating a variety of process steps can be utilized, e.g. by providing a sacrificial layer 50 that is back etched in a second step S2, until a resulting layer 51 remains with a thickness e.g. corresponding to the minimum distance hC of a first electrode layer, in particular a positive electrode layer that is coated conformally on the structure 51, and subsequently etched in a step S3, e.g. by a RIE process, so that horizontal layers are removed. Thus, by a vertical etching process, the cathode layer can be removed near the pillar top. Other mechanisms are feasible, e.g. preparing the pillar top and base with a further sacrificial resist so that the cathode layer does not stick on the pillar top and base. In a next step S4, an electrolyte layer 13 is homogenously deposited, to fully cover the cathode layer 14. In a next step S5 an anode layer 12 is deposited, which can be, optionally, done after providing a sacrificial layer similar to a sacrificial layer 51, in order to provide a minimum distance to the pillar base 112 for the anode layer 12 as well. Such a process step may be provided for each layer that is designed to have a minimum distance from the pillar base and/or top. In a final step S6 a filler material is provided that functions as an electrode, and is in contact with the anode layer 12. This filler material can be planarized as a topstrate layer, and is the counter electrode 20. The metal substrate 100 may be stacked on an organic foil (not shown). Exemplary thicknesses for the topstrate FIG. 3: dT between the pillars are larger than 50 nanometer, more preferably in the range of 0.5-1 micrometer.

Figure 8A:
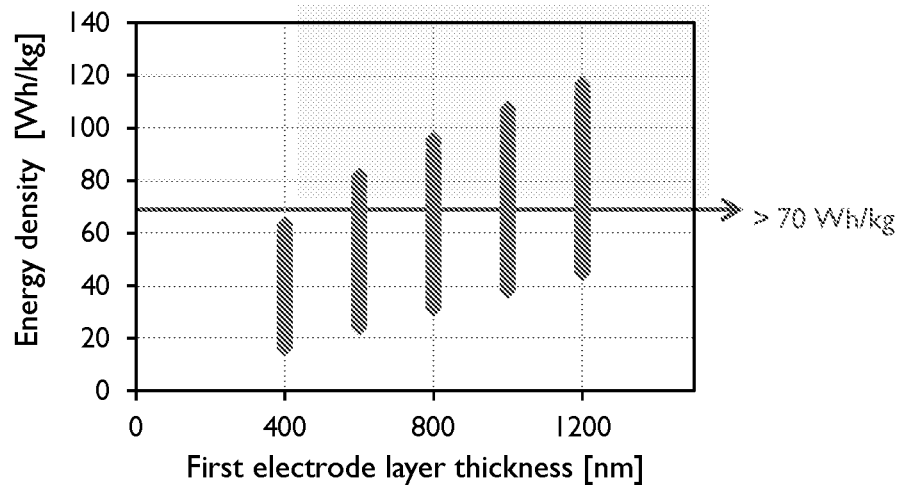
FIGS. 8a and 8b shows illustrative performance graphs of the battery structures according to an aspect of the invention.
Figure 8B:
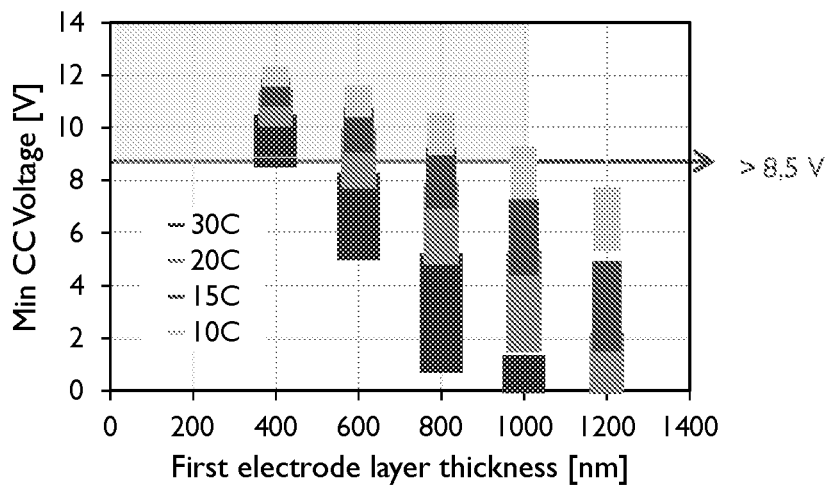

FIGS. 8A and B show exemplary results for a varying cathode thickness as first electrode, and resulting energy densities and minimum voltages for adequate functioning in cold conditions, at a temperature of −20 degrees Celsius. It is found that for a light weight battery set acceptable C-rates can be obtained, e.g a C-rate of 30-10 in a thickness range of 400-1500 nm of the cathode. Other geometry parameters are (as exemplary values): pillar height 30-100 micron, electrolyte thickness 250-750 nm, diameter of pillars 1-10 micrometer.

Surprisingly, it appears that for wide category of applications a minimum cathode thickness is found e.g. to be more than 400 nm, and, a maximum cathode thickness is less than 1500 nm.

Figure 9A:
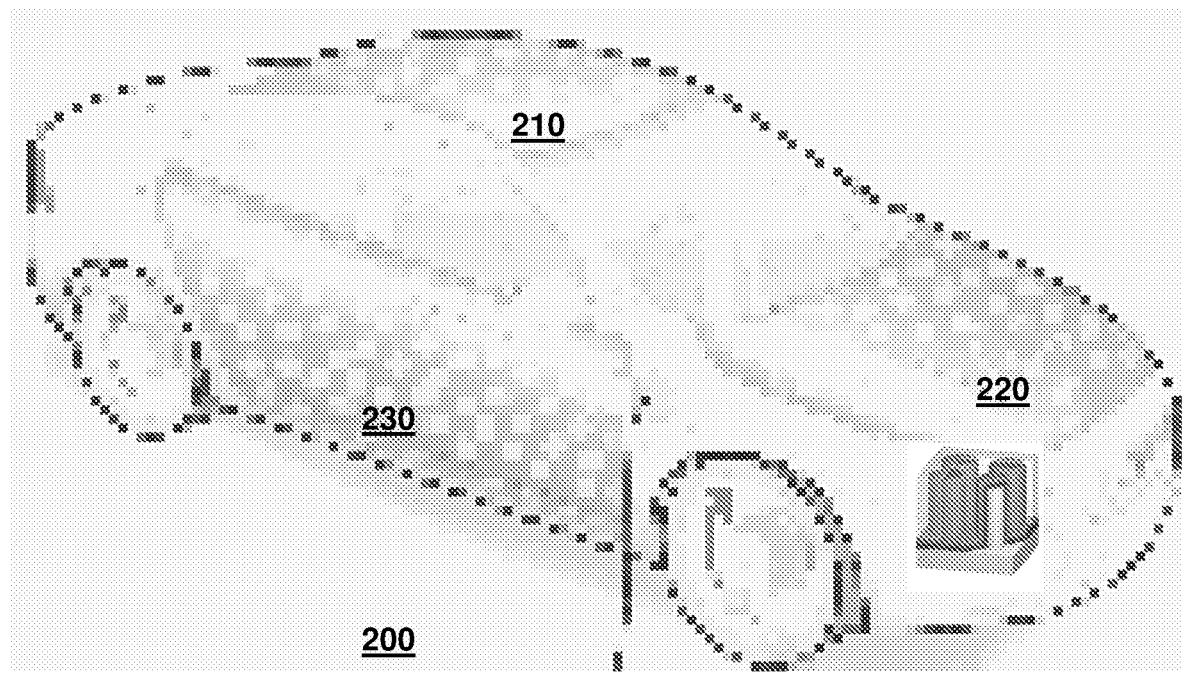
FIG. 9a shows an exemplary application.

FIG. 9A shows an example of using packaging or covers or frames of devices/machines/equipments as substrates for 3D thin-film batteries in an automobile. These 3D micropillar structures may be fabricated on the package or cover of automobile parts that use these batteries. For example in a car 200, in covers, such as a side panel 230, roof panel 210, or as a separate battery pack 220 having a weight of 7-16.5 kg and a volume of 1.8-7 liter etc., may be used for providing battery structures Accordingly the metal substrate having the high aspect ratio structure may monolithically formed as a casing structure. There are other devices that have covers made of aluminium, where this concept may be applied. Alternatively a metal substrate may be stacked on an organic foil, i.e. containing a hydrocarbon content, for example, PEN, PET etc. or plastic mould structure. Even if the packages/covers of most of the devices today are moulded of plastic, still 10s of micrometers of aluminium can be electroless plated by ionic liquids on plastics to create the battery on it or in it.

Figure 9B:
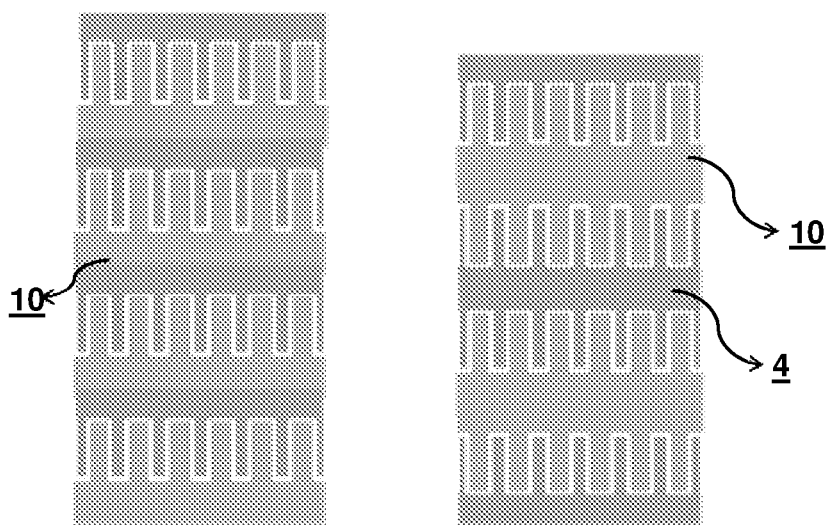
FIG. 9b show a further exemplary structure of the battery.

FIG. 9B illustrates how the high aspect ratio structures can stacked or wound in plural foil layers. Since the possibility of cracking the active layers while bending or winding is the highest in-between the pillars, it can be optionally chosen to deposit the active layers just on the pillars (and not in-between). Moreover, this will additionally also avoid cracking at the base corners around the pillars while volume expansion/contraction of the electrode layers happens during charging/discharging of the battery.

In general, in order to avoid active layers cracking while flexing or while battery operation, corners of the 3D battery structure are to be designed rounder, i.e. with a radius of curvature larger than 200 nm, or even larger than 1 micrometer.

This stacking in the 3D battery case can be done by using optionally a conductive glue 4 (if the foils are connected in series). This conductive glue 4 could also be a filler material to stabilize the pillars on each of the foils. Accordingly, a plurality of current collectors may be provided, that are alternatingly stacked with battery multilayers.

Optionally, 3D pillars could be created on both sides of the metal foil. In embodiment, this could be combined with a photovoltaic layer on one side and a battery layer on the other side or on the same side. In another embodiment this could be used to provide two battery stack layers per foil 10. In this case, the substrate foil (in case of being a metal), will act as a common electrode while stacked. The connection of different battery foils to each other in a circuit needs to be according to the voltage desired while charging and discharging.

Optionally, in order to enable easy flexing, instead of having the pillars all over the substrate foil, isolated islands of pillar-clusters be patterned in a metal foil to form an integral part of it. In an example, the high aspect ratio clusters may span an area smaller than 10e4 micrometer2; and the planar zones may be are formed as strips having a width larger than 50 micrometer, although other ranges can be suitably used to the same effect of clustering to enable easy flexing. In order to make such batteries cost-effective, it is advantageous to transfer this technology to large area metal foils e.g. for roll-to-roll processing.

It will be appreciated that while specific embodiments of the invention have been described above, that the invention may be practiced otherwise than as described. In addition, isolated features discussed with reference to different figures may be combined. The application areas of relevance are specifically a 12 Volt Starter battery, e.g. of a 40-60 Ah type that is suitable for 'cold cranking' at temperatures around minus 20 degrees Celsius. Preferably, to meet such requirements a first electrode thickness dC ranges between 400 and 1500 nm.

However, additionally, the battery device of interest may be designed as a stand-alone micro hybrid type, for example for automatic start-stop functions and regenerative breaking, wherein the battery can withstand many charging and discharging cycles. Also, the battery can be used for rapid discharging, e.g. for use in an electric super charger.

From calculations it follows that a gain in energy density (both in weight and volume) can be achieved in the range 0.1-4% by capping the electrode layers on the pillars [on top, bottom or both].

The main reason you save energy density by capping the electrode layers is because the electrodes are capacity-wise matched only at the cylindrical walls so that consequently no unmatched portions are present, in particular at the planar parts [top and bottom of pillars].

Note that in FIG. 1/9 only the first electrode is capped, resulting in minimal weight reduction not compensating for the loss in capacity of the stack. Accordingly preferably a of manufacturing a Lithium battery is provided with a current collector formed of pillars on a substrate face, wherein the method comprises: forming elongate and aligned structures forming electrically conductive pillars on the substrate face with upstanding pillar walls extending from a pillar base to a pillar top; wherein the pillars are covered with a laminate comprising a first electrode, a solid state electrolyte layer; and a second electrode layer with matched capacity; a topstrate forming an electrode part; and wherein at least one of the second electrode layer and topstrate layer does not extend to the pillar base or top.

It is found that by a non-conformal coating of any of the at least one of the first electrode layer, second electrode layer and topstrate in the laminate provided on the pillars, in the conformal parts on the pillars, electric (ionic, respectively electronic) conduction is interrupted in the laminate so that Lithium intercalation can be prevented and electric conduction substantially takes place only in the conformal parts of the laminate.

In case of coating inhomogeneity's like a thicker cathode layer at the top part of the pillar during coating, removal or prevention of forming is even more advantageous. A further increase in energy density can be achieved by also capping the electrolyte & top current collector, this would give an additional saving in the range 1-15%. Hereby two remarks are made:

1. The topstrate electron transport along the foil direction goes along the cylindrical walls of the pillars, if the part of the top CC covering the top of the pillars is capped (schematically indicated by FIG. 6). Efficient electron transport is then regulated by tuning the conduction via the topstrate in the interpillar spacing—see the range given in table 1.

2. Capping also the electrolyte requires careful (pre-) treatment of the exposed surfaces to avoid shorts. If for instance all the layers are removed at the top as shown in FIG. 6, the pillar structure 11 may be selectively insulating in this top part to avoid shorts.

Figure 2:
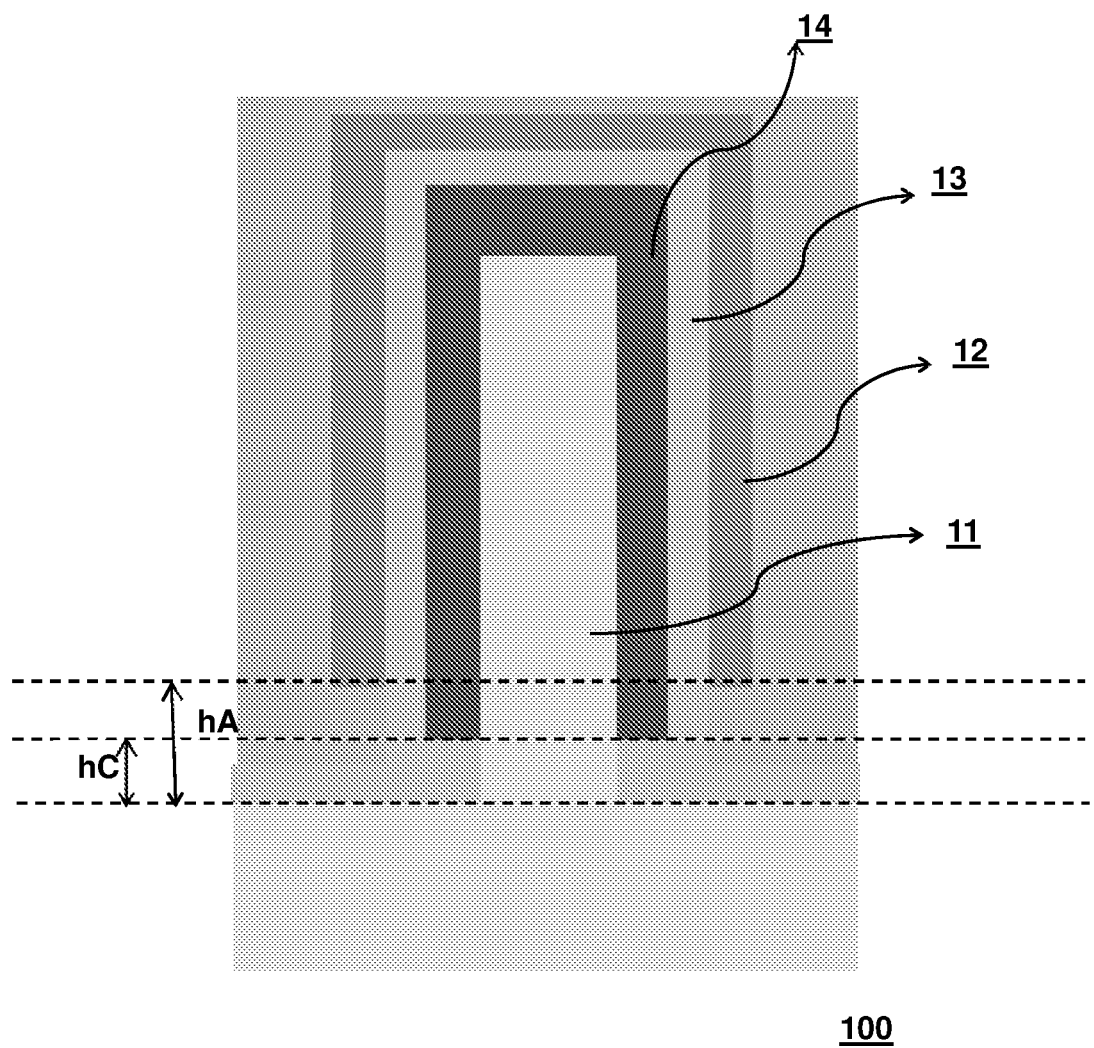
FIG. 2 shows a second embodiment.

Parameters influencing energy density saving include:
Pillar height [lower height, higher saving for pillar height above a typical value of 10 um. Below this value the capping will ultimately result in a loss in energy density].
Cathode thickness [in thicker case more saving].
Where the layers are capped [on top, on the bottom or both]. For the bottom parts reference is made to FIGS. 2/9 & 3/9. For at least one of the Top & Bottom layers: FIG. 4/9, 5/9 6/9.
The layers which are capped [the electrodes(s), electrolyte and top current collector], refers to the following illustrations in the patent: only the electrodes: FIG. 2/9, 4/9, 5/9; Electrodes AND electrolyte+top current collector

The invention claimed is:

1. A method of manufacturing a lithium battery with a current collector formed of pillars on a substrate face, wherein the method comprises: forming elongate and aligned structures forming electrically conductive pillars on the substrate face, each of the pillars having an upstanding pillar wall that extends from a pillar base to a pillar top,
wherein individual ones of the pillars are each covered with a laminate comprising:
a first electrode layer comprising a first electrode;
a solid state electrolyte layer;
a second electrode layer comprising a second electrode; and
a topstrate forming an electrode part; and
wherein the first electrode layer has a minimum distance above the pillar base ranging between 300 and 1000 nanometers, and
wherein the first electrode layer and the second electrode layer do not extend between the pillars, thereby preventing lithium intercalation into the first electrode and/or the second electrode at a location near the pillar base.

2. The method according to claim 1, wherein at least one of the group consisting of the first electrode, the electrolyte layer and the second electrode layer does not extend to the pillar top, such that a laminate structure is provided that is severed near axial ends of the pillars.

3. The method according to claim 1, wherein a minimum interdistance between pillar walls, of neighboring one of the pillars, ranges between 1-10 micrometers.

4. The method according to claim 1, wherein the current collector is manufactured in a roll-to-roll process.

5. A lithium battery comprising a current collector, wherein the current collector is formed of pillars on a substrate face, and wherein the pillars are each elongate and aligned structures forming electrically conductive pillars on the substrate face, each of the pillars having an upstanding pillar wall that extends from a pillar base to a pillar top;

wherein individual ones of the pillars are each covered with a laminate comprising:
a first electrode layer comprising a first electrode;
a solid state electrolyte layer;
a second electrode layer comprising a second electrode; and
a topstrate forming an electrode part; and
wherein the first electrode layer has a minimum distance above the pillar base ranging between 300 and 1000 nanometers; and wherein the first electrode layer and the second electrode layer do not extend between the pillars, thereby preventing lithium intercalation into the first electrode and/or the second electrode at a location near the pillar base.

6. The lithium battery according to claim 5 wherein the current collector is a high-aspect ratio structure wherein individual ones of the pillars have a radius of curvature larger than 50 nanometers.

7. The lithium battery according to claim 5, wherein the substrate is a metal foil having both faces forming a high-aspect ratio structure.

8. The lithium battery according to claim 5, having a plurality of current collectors, and wherein one of the plurality of current collectors are alternatingly stacked with respect to neighboring ones of the current collectors.

9. The lithium battery according to claim 5, wherein at least one of the group consisting of the first electrode, the solid state electrolyte layer and the second electrode layer does not extend to the pillar top, such that a laminate structure is provided that is severed near axial ends of the pillars.

10. The lithium battery according to claim 5, wherein a minimum interdistance between pillar walls, of neighboring one of the pillars, ranges between 1-10 micrometers.

11. The lithium battery according to claim 5, wherein the current collector is manufactured in a roll-to-roll process.

\* \* \* \* \*